United States Patent

Panizzi

[15] 3,646,278

[45] Feb. 29, 1972

[54] METHOD AND APPARATUS FOR AUTOMATIC SWITCHING OF RADIOS AND TAPE-RECORDERS

[72] Inventor: Rolf P. Panizzi, 5020 Hertel, Pierrefonds, Quebec, Canada

[22] Filed: June 8, 1970

[21] Appl. No.: 44,040

[30] Foreign Application Priority Data

Mar. 26, 1970 Canada ..................................078,505

[52] U.S. Cl. .........................................179/100.11, 307/112

[51] Int. Cl. .........................................................H04b 1/20

[58] Field of Search ...................179/1, 1 SW, 100.1, 100.11; 307/112

[56] References Cited

UNITED STATES PATENTS

| | | | |
|---|---|---|---|
| 2,766,378 | 10/1956 | Sundin et al | 179/1 SW X |
| 2,834,840 | 5/1958 | Flan et al | 179/1 SW X |
| 3,400,227 | 9/1968 | Lear et al | 179/100.11 |
| 3,541,273 | 11/1970 | Lyon, Jr. et al | 179/100.11 X |
| 3,582,965 | 6/1971 | DeMetrick | 179/100.11 |
| 3,493,681 | 2/1970 | Richards | 179/1 |
| 2,610,251 | 9/1952 | Torsch | 179/1 |
| 3,536,859 | 10/1970 | Tolar | 179/100.11 |

*Primary Examiner*—D. F. Duggan
*Attorney*—Stevens, Davis, Miller & Mosher

[57] ABSTRACT

There is provided automatic switch means responsive to an audio output or an 'on' state of an audio unit for turning off the power supply to another audio unit and concomitantly diverting or switching the output from the first-mentioned audio unit to the electrical-acoustic transducer which was previously supplied from the output of the second-mentioned audio unit. The invention has particular, but not inclusive, use in turning off an automobile radio when a tape-recorder is switched on and switching the outputs so that a common loudspeaker system may be used.

20 Claims, 3 Drawing Figures

Patented Feb. 29, 1972 3,646,278

3 Sheets-Sheet 2

METHOD AND APPARATUS FOR AUTOMATIC SWITCHING OF RADIOS AND TAPE-RECORDERS

The present invention relates to a method and apparatus for automatically deenergizing a first piece of audio equipment when a second piece of audio equipment is turned-on.

When one loudspeaker or a pair of loudspeakers is to be used for both pieces of audio equipment, the invention further contemplates automatic switching of the speakers. The invention has particular, but not exclusive utility, in connection with audio combinations comprising a first piece of equipment, for example an A.M or A.M. or F.M. radio, a phonograph, or a tape-recorder/reproducer, and a second piece of equipment, for example, any of the first-mentioned items of equipment, but more particularly a cassette or cartridge-type tape-recorder. The invention has significant utility in automobiles, buses, aircraft and boats etc.

Taking automobiles, as an example, it is very common for such to have a radio fitted. It is also becoming common to fit a tape-recorder, of the cartridge or cassette type, in automobiles. The development of press-button tuning on car radios and of cartridges or cassettes stems from the need to free the driver, in particular, from all but the most simple motions when operating such audio equipment.

Thus, in the example chosen, a car driver may be listening to a radio program monaurally or stereophonically, through one or two loudspeakers. The driver may then wish to play a monaural or stereo cartridge or cassette, through a tape-recorder in the car, and to use the same single or pair of loudspeakers as were used previously with the radio. Since neither car radios or tape-recorders are fitted with changeover switches, a changeover switch for the respective power supplies and another changeover switch for the loudspeakers must be provided.

Such switches are an annoying "extra" for the driver whose attention may be diverted whilst operating such switches. The present invention envisages automatic switching for the process, but more particularly, envisages performing all necessary switching by the simple expedient of plugging-in a cartridge or cassette into a tape-recorder.

In this disclosure, the words "audio unit" are intended to imply any electrically powered piece of equipment having an electrical output for driving an electrical/acoustic transducer, and includes at least radios, phonographs, tape recorders and sound-on-film devices.

The words "tape-recorder" herein includes machines capable of recording and/or playback.

It is an object of one feature of the invention to provide a method of automatic switching of a power supply from one audio unit to another audio unit and concomitantly switching the output of the said units feeding a common loudspeaker.

A method of switching 'off' or 'on' selected ones of a plurality of audio units and simultaneously switching the output signal of any audio unit which is onto a common electrical/acoustic transducer, said method comprising the steps: sensing the 'on' condition of a selected audio unit to provide an activating signal, switching the signal received by said common electrical/acoustic transducer from any one audio unit turned 'off' and, simultaneously switching to any one audio unit turn 'on', in response to presence of an activating signal.

It is an object of another feature of the invention to provide dual automatic switch means, for use with audio units having output feeding loudspeakers or the like, for turning off one of the audio units when another of the audio units is turned on, and for appropriate switching of the units to an associated loudspeaker systems.

An automatic switching device for use with a plurality of audio units having outputs sharing common electrical/acoustic transducer means, said switching device comprising: first switch means for interrupting the power supply to a first one of said audio units, second switch means for switching-on a second one of said audio units, third switch means for transferring the signal received by said electrical/acoustic transducer from the output of said first one of said audio units to the output of said second one of said audio units, said first, second and third switch means being simultaneously operable and, actuating means responsive to the closing of said second switch means on said second one of said audio units for controlling said first and third switch means.

A preferred embodiment of the invention will now be described with reference to the accompanying drawings, in which.

Figure 1:
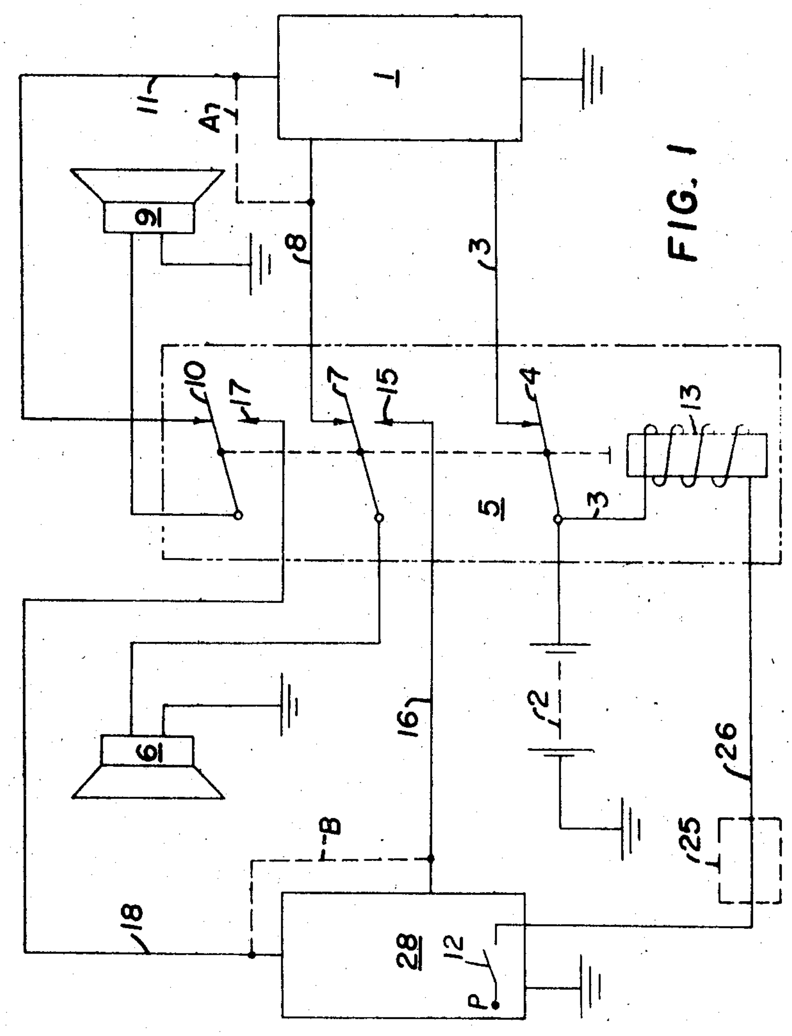
FIG. 1 is a circuit for automatic switching between two audio units and two loudspeakers.

Referring now to FIG. 1, a battery 2 feeds a radio 1, which is stereophonic through normally closed contact 4 of a relay 5. The radio 1 has a first channel output 8 feeding a loudspeaker 6 through normally closed contact 7 and a second channel output 11 feed a loudspeaker 9 through normally closed contact 10. The radio will conventionally have an ON-OFF switch and the output of the radio will feed the loudspeaker in the normal manner without reference to the remaining portion of the circuit, now to be described.

A stereocartridge or cassette tape recorder 28 is connected, via line 26 to the coil 13 of the relay 5, to the battery 2.

The tape-recorder 28 has stereo outputs 16 and 18 fee;ing speakers 6 and 9 through contacts 15 and 17, respectively, when the coil 13 is energized.

Conventionally, the tape-recorder remains unenergized until a cartridge or cassette is plugged into it thereby closing switch 12.

If the radio is monaural, lines 8 and 11 may be joined as at A, and similarly, if the tape-recorder is monaural lines 16 and 18, may be joined as at B. If only one loudspeaker is to be used, no connections need be made to relay contacts 10 and 17 and A and B.

It will be appreciated that radio 1 does not need to have been switched on prior to using the tape-recorder 28.

Further it will be noted that when a cartridge or cassette, is withdrawn from the unit 28, in exchange for another cartridge or cassette, the radio will be switched on. Since this might be objectionable, a delay 25 may be included in the relay winding circuit. The delay 25 may be of fixed or variable time. The delay should at least provide sufficient time for a driver to remove one tape and select and insert another tape.

Figure 2:
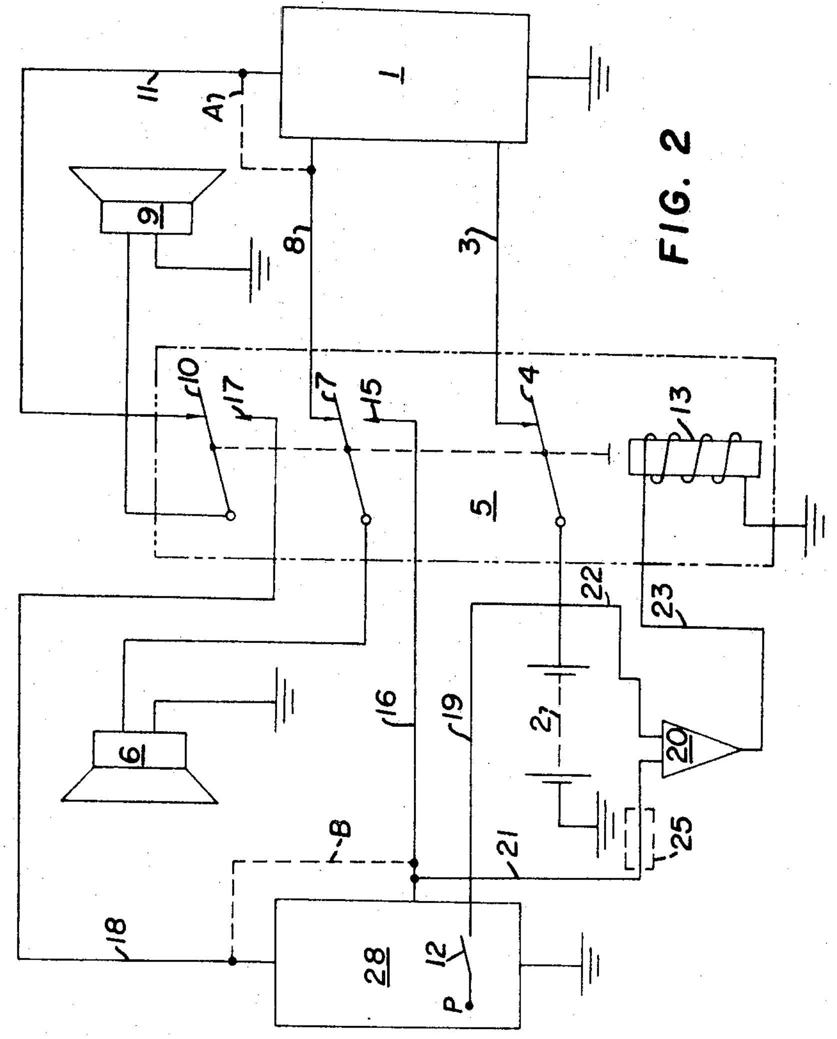
FIG. 2 is a circuit, similar to that in FIG. 1, but including amplifier means for the relay.

In my invention I have envisaged that there are still a large number of nontransistorized car radios in use. These usually draw a fairly large current due mainly to cathode heaters and vibrator units. Thus, the switching relay must be capable of handling high initial and steady currents which are fairly inductive. On the other hand, almost without exception, all tape-recorders are of the transistor type and as such draw a maximum current of about 1 amp. This current, or somewhat less, must be capable of pulling the relay 5. In order to assist this process a small amplifier may be included. Such an embodiment is shown in FIG. 2 wherein similar elements are designated by the same numerals or letters. In this second embodiment power is available for the tape-recorder 28 via line 19. Lines 21 and 22 constitute an input to an amplifier 20 whose output is passed via line 23 to the relay coil 13. Thus, when the tape-recorder 28 is switched on, usually by the insertion of a tape cassette or cartridge, the current drawn will energize the coil 13 thereby turning off the radio unit 1 and also switching the speakers, as previously discussed. Time delay 25 is also optional in this embodiment.

Figure 3:
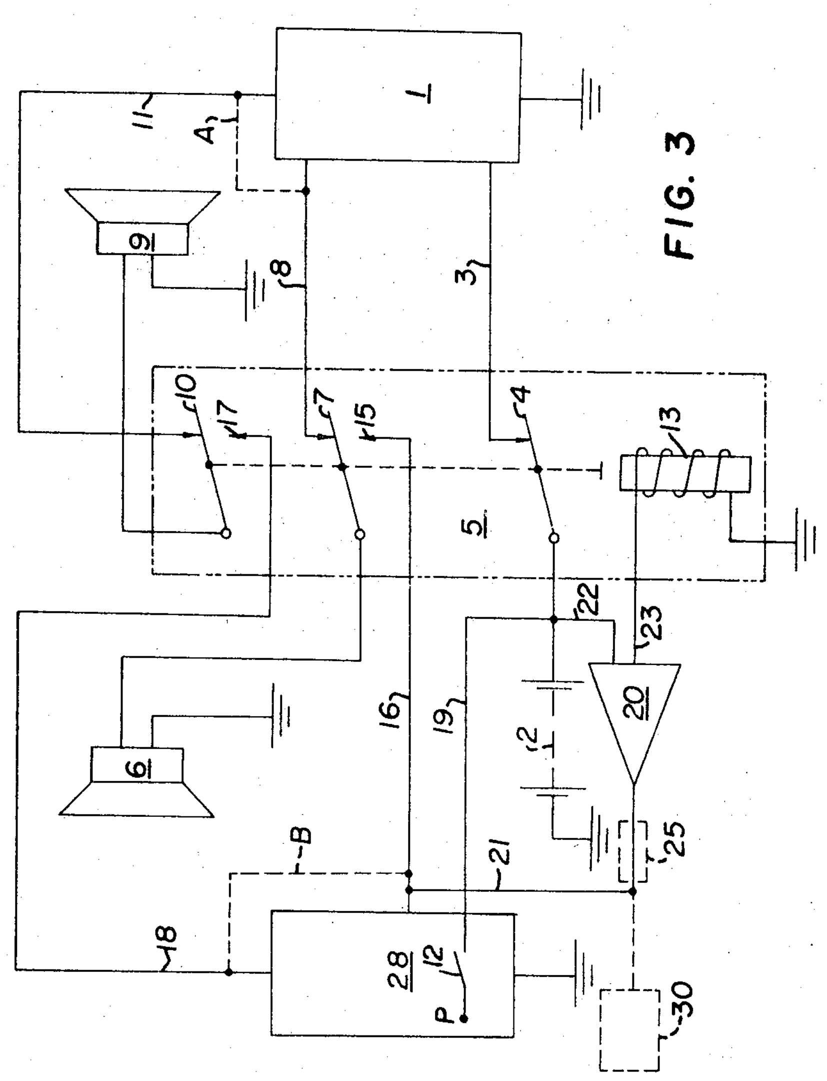
FIG. 3 is a further circuit, similar to the FIG. 2 circuit, but wherein switching is activated by the output signal of one of the audio units.

Referring now to FIG. 3 there is shown an embodiment very similar to that shown in FIG. 2 and wherein like numerals or letters designate similar components.

In this embodiment a radio, tape-recorder or other piece of audio equipment is provided with a power supply via line 19. The unit 28 is thus permanently connected to the battery 2. In the case of the unit 28 being a tape-recorder the unit may be switched on as discussed in connection with FIG. 1 and FIG. 2 i.e., by the insertion of a cassette or cartridge. It will be noted that the acoustic output signal is again passed to the relay 5 via line 16 and also at the same output is fed via a line 21 to an amplifier 20. Thus, if unit 28 is a radio the output signal on line 21 can be made to occur only when the unit 28 is excited. For example, if the unit 28 is a radio employed on standby emergency duties only, the presence of an audio output signal on line 21 can be made to activate the relay system, or its equivalent as previously discussed. It will be appreciated that unit 28 will function in the same manner if it be a tape-recorder, radio or other piece of audio equipment.

It is also envisaged that to make the system compatible with that described in FIG. 1 and FIG. 2, that the output signal along line 21 of FIG. 3 need be, in certain circumstances, only a background noise such as is normally present in the output signal of a tape recorder. Thus, in this embodiment insertion of a cassette or cartridge into a unit 28 will switch off unit 1 and reverse the contacts in the relay 5. In the case of standby radio use the operator may link unit 1 from loudspeakers 6 and 9 through contacts 7 and 10 respectively until the reception of standby radio signal in which case the reception of the signal by unit 28 will produce an exciting signal along unit 21 which is substantially amplified if need be, by amplifier 20 prior to being utilized to activate the relay 5. A further piece of equipment, shown dotted at 30, may also be used to effect switching.

While the invention has been described with reference to the use of a relay, it is to be understood that this relay may be replaced by an integrated circuit or other solid-state switching device responsive to the passage of a current therethrough. It is to be further understood that the radio unit 1 may also be an audio amplifier, phonograph, tape-recorder or the audio section of audiovisual apparatus. Again, loudspeakers 6 and 9 may be any electroacoustic transducer such as earphones. The tape-recorder 28 may be replaced by any of the alternatives listed above in connection with the radio 1.

While the invention is described with reference to a pair of speakers, used monaurally or stereophonically, it will be appreciated that the number of contacts in the relay 5, or switching modes in the equivalent integrated or solid-state circuit, may be increased or varied to suit any number of audio sources or loudspeaker arrangements.

In the embodiments of FIGS. 1, 2 and 3 it is envisaged that the unit 1 may be a radio, phonograph, tape recorder or audiovisual apparatus and that unit 28 may also be selected from the same group. As mentioned before any one piece of audio equipment may be monaurally or stereophonic.

Other embodiments falling within the terms of the appended claims will occur to those skilled in the art.

I claim:

1. An automatic switching device for use with a plurality of audio units having outputs sharing common electrical-acoustic transducer means, said switching device comprising:
 i. first switch means for interrupting the power supply to a first one of said audio units,
 ii. second switch means for switching-on a second one of said audio units,
 iii. third switch means for transferring the signal received by said electrical-acoustic transducer means from the output of said first one of said audio units to the output of said second one of said audio units, said first, second and third switch means being simultaneously operable and,
 iv. actuating means responsive to the closing of said second switch means on said second one of said audio units for controlling said first and third switch means.

2. An automatic switching device according to claim 1, wherein said first and third switch means and said actuating means form a relay.

3. An automatic switching device according to claim 2, wherein said second one of said audio units is a tape-recorder, and wherein said second switch is closed by the insertion of a cassette or cartridge into said tape-recorder.

4. An automatic switching device according to claim 1, wherein said first and third switch means and said actuating means form a relay and wherein the said actuating means is the coil of said relay and wherein the current drawn by said second one of said units is amplified and passed through said coil.

5. An automatic switching device according to claim 1 further including a time delay device to prevent the actuating means from reverting to its original state before the closing of said second switch means.

6. An automatic switching device for use with a plurality of audio units having outputs selectively connected to common electrical/acoustic transducer means, said switching device comprising:
 i. first switch means for interrupting the power supply to a first one of said audio units,
 ii. means for exciting a second one of said audio units to produce an audio output therefrom,
 iii. second switch means for transferring the signal received by the said electrical/acoustic transducer means from the output of said one of said audio units to the output of said second one of said audio units, said first switch means, said means for exciting the second one of the audio units and the second switch means being simultaneously operable, and
 iv. actuating means, responsive to the output from said second one of said audio units, for controlling the said first and second switch means.

7. An automatic switching device according to claim 6, wherein said second one of said audio units is a tape-recorder excited by the insertion thereinto of a cassette or cartridge.

8. An automatic switching device according to claim 6, wherein said second one of said audio units is a radio excited by the reception of a radio signal.

9. An automatic switching device according to claim 7 further including amplifier means between said tape-recorder and said actuating means.

10. An automatic switching device according to claim 8 further including amplifier means between said radio and said actuating means.

11. An automatic switching device according to claim 6 further including delay means associated with output of said second audio unit.

12. An automatic switching device according to claim 9 further including delay means associated with output of said second audio unit.

13. A method of switching 'off' or 'on' a selected one of a plurality of audio units and simultaneously switching the output signal of any audio unit which is on to a common electrical/acoustic transducer, said method comprising the steps:
 i. sensing the 'on' condition of a selected audio unit to provide an actuating signal,
 ii. switching the signal received by said common electrical acoustic transducer from any one audio unit turned 'off' and simultaneously switching to any one audio unit turn 'on', in response to presence of an actuating signal.

14. A method according to claim 13, wherein the selected audio unit is a tape recorder turned on by the insertion of a cassette or cartridge.

15. A method according to claim 13, wherein the selected audio unit is a radio excited by the reception of an RF signal.

16. An audio system comprising
 a. a first audio unit (1) having an audio output,
 b. a second audio unit (28) having an audio output and including second switch means (12) operable by the insertion of a cartridge or cassette therein,
 c. at least one electromagnetic transducer (6, 9),
 d. a first switch means (4) coupled between a power source (2) and said first audio unit,
 e. third switch means (7, 10) coupled between said electromagnetic transducer and the outputs of said first and second audio units, and f. actuating means (13) responsive to operation of said second audio unit and coupled to said audio unit and to said first and third switch means, said actuating means actuating said first switch means to disconnect said first audio unit from said power source and actuating said third switch means to transfer said electromagnetic transducer from the audio output of one of said audio units to the other.

17. An audio system as defined by claim 16 which further comprises an amplifier (20) coupling the audio output of said second audio unit to said actuating means, said actuating means being energized when a signal is present at the audio output of said second audio unit.

18. An audio system as defined by claim 16 which further comprises a delay unit (25) interposed between said second audio unit and said actuating means, said delay unit preventing said first audio unit from being energized during the interval between removal of a cartridge or cassette from said second audio unit and its replacement by another cartridge or cassette.

19. An audio system as defined by claim 16 wherein first and second electromagnetic transducers are provided and said third switch means comprises first and second elements, the first and second elements of said third switch means selectively coupling said first and second electromagnetic transducers respectively to the output of either said first or second said audio unit.

20. An audio system as defined by claim 16 wherein said actuating means comprises a relay coil; said first switch means comprises normally closed movable and fixed contacts, and said third switch means comprises a movable contact coupled to said electromagnetic transducer and a pair of fixed contacts coupled respectively to the audio outputs of said first and second audio units.

* * * * *